United States Patent [19]

Carr, Jr. et al.

[11] 4,201,399
[45] May 6, 1980

[54] TOWING APPARATUS

[75] Inventors: Harold F. Carr, Jr., Hixson, Tenn.; David F. Humphries, Rossville, Ga.

[73] Assignee: Ernest Holmes Division Dover Corporation, Chattanooga, Tenn.

[21] Appl. No.: 911,887

[22] Filed: Jun. 2, 1978

[51] Int. Cl.² ............................................. B60P 3/06
[52] U.S. Cl. ................................... 280/402; 414/563
[58] Field of Search .................. 294/74; 114/249, 252, 114/230; 254/139.1, 166, 133; 214/86 R, 86 A; 280/402, 179 R, 179 A

[56] References Cited

U.S. PATENT DOCUMENTS

| | | | |
|---|---|---|---|
| 2,796,183 | 6/1957 | Cline | 214/86 A |
| 3,152,704 | 10/1964 | Russel | 214/86 A |
| 3,154,205 | 10/1964 | Gillem | 214/86 A |
| 3,182,828 | 5/1965 | Ormsby | 214/86 A |
| 4,007,702 | 2/1977 | Johnson | 114/230 |
| 4,010,858 | 3/1977 | Mahnke | 280/402 |
| 4,039,217 | 8/1977 | Bryant | 294/74 |

Primary Examiner—John J. Love
Assistant Examiner—Randall A. Schrecengost
Attorney, Agent, or Firm—Lamont Johnston

[57] ABSTRACT

A cushioning pad for attachment to a sling belt of a towing sling and for positioning between the belt and the bumper of a towed vehicle. The cushioning pad is an elongated sleeve adapted for slidable attachment to the sling belt and includes a bumper retainer at one end of the sleeve for preventing the bumper of the towed vehicle from passing over the sleeve upon a forward lurch of the vehicle. A slide preventor prevents the sliding of the sleeve upon the sling belt when the towing sling is being utilized to tow the vehicle.

4 Claims, 6 Drawing Figures

TOWING APPARATUS

BACKGROUND

1. Field of the Invention

The present invention relates to a towing apparatus and more particularly to a towing sling and cushioning pads for attachment to said towing sling, of the type adapted for use in towing automobiles, trucks and other motor vehicles of a like nature by wreckers and other towing vehicles.

2. Description of the Prior Art

The usual method of towing a vehicle, e.g. automobile, truck, bus, etc., is to attach a towing sling to the vehicle and to a crane of the towing vehicle, such as a wrecker, and to suspend the end of the vehicle off the ground. The vehicle is then towed away. Usually during such towing the towed vehicle lurches forwardly or rearwardly, due to changes in the speed of the towing vehicle, e.g. a short stop, or unevenness of the road over which the vehicle is being towed. Such lurching can cause damage to the vehicle being towed. For the most part, prior art towing slings provide only slight cushioning means for protecting the finish and decorative parts of the vehicle during such lurching. Moreover, they generally provide no protection from wear and damage to the towing sling itself. Slings which are designed to provide some cushioning protection, do not however prevent the vehicle from riding up on the towing sling during a forward lurch and causing damage to the vehicle being towed.

There are many prior art towing slings, see for example:

U.S. Pat. No. 2,796,183;
U.S. Pat. No. 3,152,704;
U.S. Pat. No. 3,182,828;
U.S. Pat. No. 4,007,702; and
U.S. Pat. No. 4,010,858.

None however provide an adjustable cushioning means to prevent damage to the vehicle and towing sling itself, nor prevent the vehicle from riding up the sling during a forward lurch.

SUMMARY OF THE INVENTION

It is an object of the present invention to provide a towing sling that will cushion the vehicle and prevent damage thereto during the towing operation.

It is another object of this invention to provide a cushioning means which will protect the towing sling from wear and damage during the towing operation.

It is another object of this invention to provide a towing sling which prevents the vehicle being towed from riding up the sling during a forward lurch.

Still another object of this invention is to provide cushioning pads for attachment to a towing sling, said pads being strong, lightweight, inexpensive in construction and easily replaced when worn out.

A further object of this invention is to provide cushioning pads for attachment to a towing sling, which are easily and readily positioned under the bumper of the vehicle being towed and prevent the vehicle from riding up the towing sling from a forward lurch.

The present invention is directed to a cushioning pad adapted for attachment to a sling belt of a towing sling and adapted for positioning between the belt and the bumper of a towed vehicle. The cushioning pad is comprised of:

(A) an elongated sleeve adapted for slidable attachment to the sling belt;

(B) a bumper retainer means at one end of the sleeve for preventing the bumper of the towed vehicle from passing over the sleeve upon a forward lurch of the vehicle; and (C) a slide prevention means for preventing the sliding of the sleeve upon the sling belt when the towing sling is being utilized to tow the vehicle.

The invention is further directed to an improved towing sling utilizing such cushioning pads.

Other objects and advantages will become apparent from the following description taken in conjunction with the accompanying drawings.

DESCRIPTION OF THE PREFERRED EMBODIMENT

Figure 1:
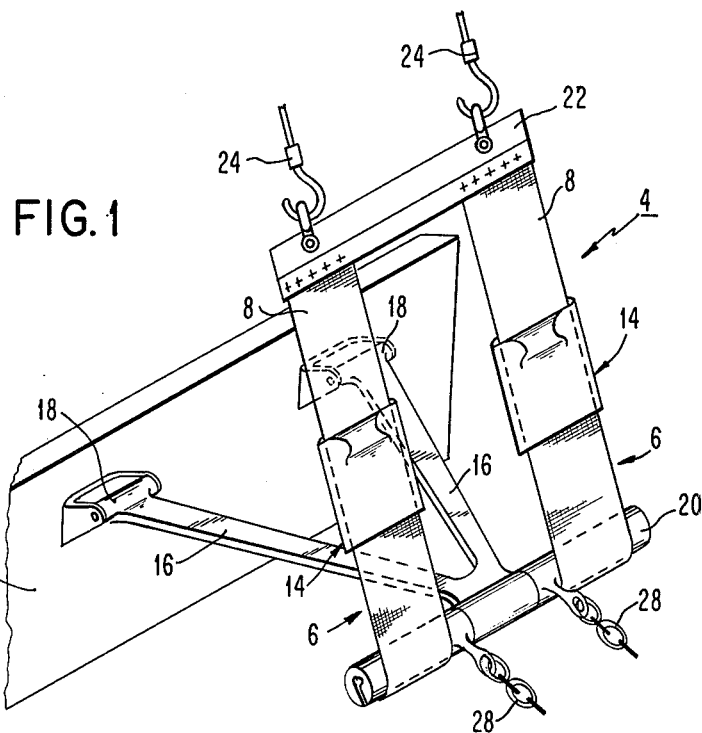
FIG. 1 is a perspective view of an embodiment of the towing sling of this invention having attached thereto an embodiment of the cushioning pads of this invention. The towing sling is attached to a towing vehicle and lowered to a position at which it is ready to be connected to the vehicle to be towed.
Figure 2:
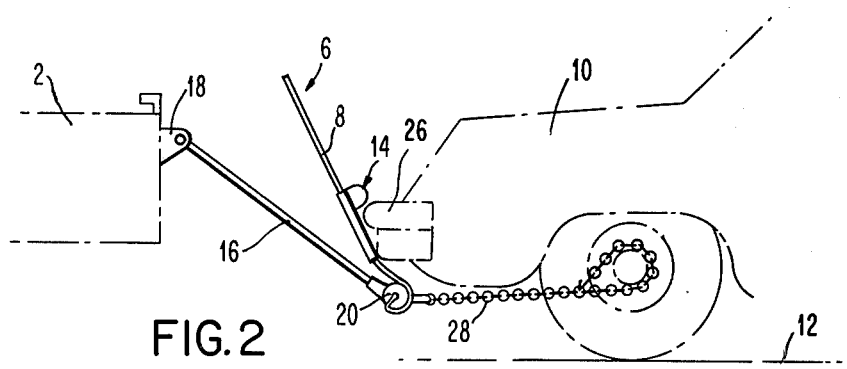
FIG. 2 is a side elevational view of the towing sling and cushioning pads of FIG. 1 shown attached to a towing vehicle and to an automobile just prior to raising the automobile for towing.
Figure 3:
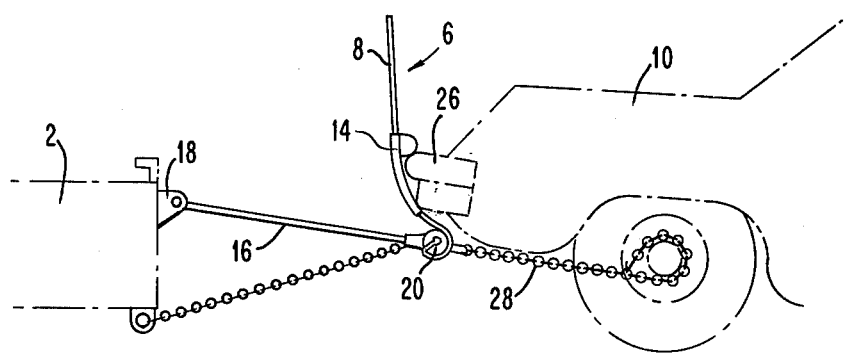
FIG. 3 is a side elevational view of the towing sling and cushioning pads of FIG. 1 shown attached to a towing vehicle and to an automobile in towing position.

In general the cushioning pad and improved towing sling of this invention are adapted to be used in conjunction with a towing apparatus attached to a wrecker type towing vehicle generally designated as (2). The towing vehicle (2) is provided with a lifting means (4) as seen in FIGS. 1 through 4.

The towing sling (6) generally consists of a plurality of sling belts (8). The two primary functions of the towing sling (6) is that of towing the vehicle (10) while keeping the vehicle (10) at a substantially constant spaced relationship from the towing vehicle (2) and that of safely lifting either end of the vehicle (10) from the ground (12) to facilitate safe and easy towing.

The towing apparatus upon which the cushioning pads (14) are used, generally consists of a tow bar arrangement including a pair of convergently extending tow bars (16) which are connected at their divergent ends by vertical pivoting connections (18) to the towing vehicle (2), and swingably connected at their convergent ends to a spreader bar (20). The function of safely lifting either end of the towed vehicle (10) is performed by the towing sling (6) in conjunction with the hoisting or lifting mechanism (not shown) of the tow truck (2). The towing sling (6) consists of a plurality of sling belts (8), preferably two, each attached at its lower end to spreader bar (20) and at its upper end to hoist bar (22) which is in turn connected to a plurality of hoist hooks (24). The hoist hooks (24) are connected to the hoisting or lifting mechanism of the tow truck (2).

The spreader bar (20) is provided with means for attaching the spreader bar (20) to a vehicle to be towed (10) in a position under and behind the bumper (26) (FIGS. 2 and 3) of vehicle (10). Such means, as depicted, may be the conventional grab hooks (28) (FIGS. 1, 2 and 3) which are intended to be engaged with portions of the under carriage of the towed vehicle (10), such as frame members and the like.

The aforedescribed towing apparatus and variations thereof, are well known to those skilled in the art. This invention may be used in conjunction with any type towing apparatus which utilizes a towing sling of the aforedescribed type.

The cushioning pad (14) of this invention is adapted for attachment to the sling belt (8) of the towing sling (6). The cushioning pad (14) is further adapted for positioning between the sling belt (8) and the bumper (26) of the towed vehicle (10).

The cushioning pad (14) prevents metal to metal contact between for example, a metal sling belt, e.g. a chain (not depicted) and the towed vehicle (10), particularly the bumper (26) and grillwork of the towed vehicle (10). Preferably, however, the towing sling (6) consists of rectangular webbed sling belts (8), e.g. fabric reinforced belting, as depicted in FIG. 1. Cushioning pads (14) used in conjunction with such an embodiment further cushion the bumper (26) and prevent wearing out of the sling belt (8) by the contact of the bumper (26) against the belt (8).

Upon the attachment of the spreader bar (20) in a position under and behind bumper (26) of vehicle (10) the cushion pad (14) is positioned under the bumper (26), cushioning the sling belt (8).

Figure 5:
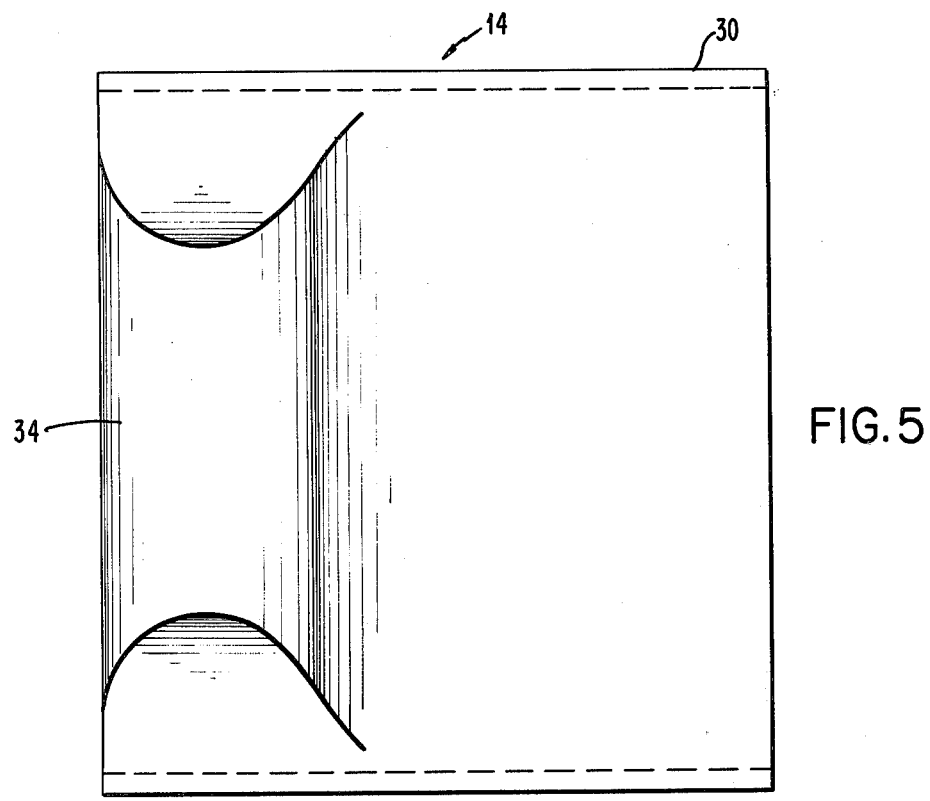
FIG. 5 is a top plan view of the cushioning pad of FIG. 4.
Figure 6:
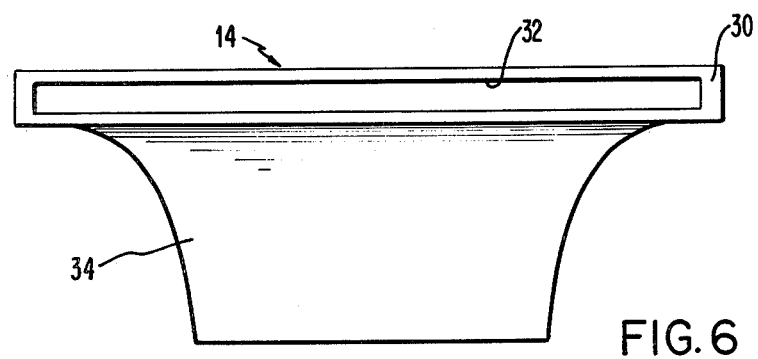
FIG. 6 is a sectional view of the cushioning pad of FIG. 4 taken along line 6—6 of FIG. 4.

The cushioning pad (14) is further comprised of an elongated sleeve (30) (FIGS. 4 to 6) adapted for slidable attachment to the sling belt (8). The shape of the sleeve (30) is preferably rectangular as depicted in the embodiment shown, but may be of any shape. The sleeve (30) is of a length sufficient to encase a portion of the length of the sling belt (8).

The opening (32) of the sleeve (30) is of a shape and size to slide along the sling belt (8) [e.g. the opening (32) substantially conforms to the shape of the sling belt (8)] when the sling belt (8) is not supporting a vehicle for towing.

The cushioning pad (14) is further comprised of a bumper retainer means, generally designated as (34), at one end of sleeve (30). The bumper retainer means (34) is for preventing the bumper (26) of the towed vehicle (10) from passing over the sleeve (30) upon a forward lurch of the vehicle (10). Such a forward lurch can be brought about by, for example, a short stop by the towing vehicle (2) which would tend to cause the towed vehicle (10) to continue in its forward motion and up the towing sling (6).

Figure 4:
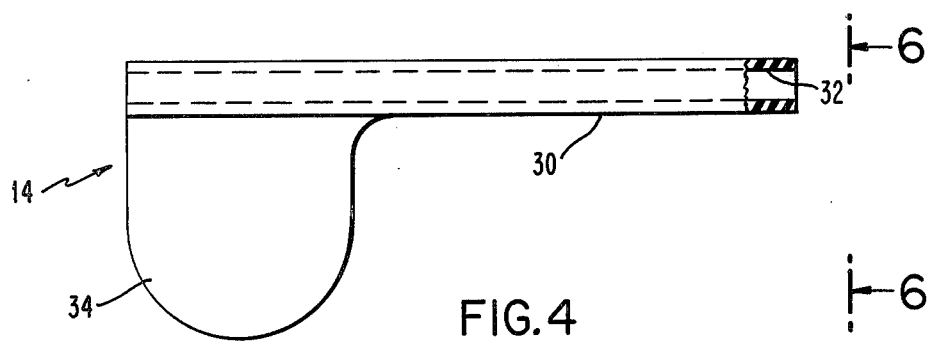
FIG. 4 is an enlarged side elevational view of a cushioning pad of FIG. 1 prior to attachment to the towing sling.

The bumper retainer means (34) may be of any shape and size sufficient to perform its function of preventing the vehicle (10) from passing or riding over the sleeve (30). Preferably, for ease of construction and cushioning effect it is desirable that the bumper retainer means (34) be a substantially cylinderical (as depicted in FIG. 4) projection from sleeve (30) along a portion of the width of sleeve (30). Preferably the bumper retainer means (34) is centered along the width of sleeve (30) to allow for the even distribution of force against the retainer means (34) during a forward lurch.

The cushioning pad (14) is further comprised of a slide prevention means for preventing the sliding of the sleeve (30) upon the sling belt (8) when the towing sling (6) is being utilized to tow the vehicle (10). This slide prevention means additionally prevents sliding of the sleeve (30) when a forward lurch causes the bumper (26) of the towed vehicle (10) to impact against the bumper retainer means (34).

One embodiment of a slide prevention means is to construct a portion of sleeve (30) of a semi-rigid flexible material which upon bending by the towed vehicle (10) gripingly engages sling belt (8), preventing the sliding of the sleeve (30) upon the sling belt (8). Other embodiments of the slide prevention means may be utilized, such as a positive locking type slide prevention means.

Preferably for ease of construction and cushioning effect, not only is a portion of sleeve (30) constructed of semi-rigid flexible material, but the total cushioning pad (14) is so constructed. Preferred materials are rubber, polyurethane, Neoprene, Buna-N or other polymeric materials well known in the art. The pad may be reinforced by, for example steel rods, wire strands or a woven material embedded therein.

In use the towing sling (6) and spreader bar (20) are positioned under the bumper (26). The cushioning pads (14) are then slid into position under the bumper (26). The towing sling is then lifted by the lifting means (4) and the vehicle (10) is lifted off the ground (12). The weight of the vehicle (10) causes a portion of sleeve (30) to bend and deform and gripingly engage the sling belt (8). Upon towing vehicle (10) a forward lurch will cause the vehicle to be driven into the bumper retainer means (34). The bumper retainer means (34), locked onto the sling belt (8) by the sleeve (i.e. slide prevention means) prevents the bumper (26) of the towed vehicle from passing over the sleeve (30).

Although the invention has been described and illustrated in detail, such is not to be taken as restrictive thereof, but it is intended to include all modifications that would appear to one skilled in the art to be within the spirit of the invention.

What is claimed is:

1. A cushioning pad adapted for attachment to a sling belt of a towing sling and for positioning between the belt and the bumper of a towed vehicle comprising:
    (A) an elongated sleeve for slidable attachment to the sling belt and held thereto by being deformed by engagement with the towed vehicle to grippingly engage the belt; and
    (B) a projection attached to the sleeve along a portion of the width of the sleeve as a bumper retainer means for preventing the bumper of the towed vehicle from passing over the sleeve upon a forward lurch of the vehicle.

2. The pad of claim 1 in which the pad is constructed of a semi-rigid flexible material.

3. A cushioning pad adapted for attachment to a sling belt of a towing sling and adapted for positioning between the belt and the bumper of a towed vehicle comprising:
    (A) an elongated sleeve adapted for slidable attachment to the sling belt, a portion of the sleeve being constructed of a semi-rigid flexible material which upon bending by the towed vehicle grippingly engages the sling belt preventing the sliding of the sleeve upon the sling belt; and
    (B) a bumper retainer means at one end of the sleeve for preventing the bumper of the towed vehicle from passing over the sleeve upon a forward lurch of the vehicle.

4. An improved towing sling having a plurality of sling belts in which the improvement comprises attachment to each of said belts the cushioning pad of any of claims 1 through 3.

* * * * *